(12) United States Patent
Hurtis et al.

(10) Patent No.: US 8,047,299 B2
(45) Date of Patent: Nov. 1, 2011

(54) CROP RESIDUE AND SOIL CONDITIONING AGRICULTURAL IMPLEMENT

(75) Inventors: Paul A. Hurtis, Mackinaw, IL (US); Joseph M. Keeler, Pewaukee, WI (US); Tim Blunier, Danvers, IL (US)

(73) Assignee: CNH America LLC, New Holland, PA (US)

( * ) Notice: Subject to any disclaimer, the term of this patent is extended or adjusted under 35 U.S.C. 154(b) by 147 days.

(21) Appl. No.: 11/611,032

(22) Filed: Dec. 14, 2006

(65) Prior Publication Data

US 2008/0142233 A1   Jun. 19, 2008

(51) Int. Cl.
*A01B 49/02*   (2006.01)

(52) U.S. Cl. ........................ 172/146; 172/140; 172/174

(58) Field of Classification Search ............... 172/140, 172/184, 145, 146, 149, 150, 153, 178, 180, 172/518, 520, 540, 174, 175, 599, 311, 668, 172/663, 664, 675, 138

See application file for complete search history.

(56) References Cited

U.S. PATENT DOCUMENTS

| | | | | |
|---|---|---|---|---|
| 488,779 | A | | 12/1892 | Spaulding et al. |
| 1,473,519 | A | | 11/1923 | Rolli |
| 1,611,358 | A | * | 12/1926 | Miller ........................ 172/594 |
| 1,626,572 | A | * | 4/1927 | Wiese ........................ 172/178 |
| 2,412,715 | A | * | 12/1946 | Callahan ..................... 172/534 |
| 2,455,147 | A | * | 11/1948 | Traver ........................ 280/469 |
| 2,588,585 | A | | 3/1952 | Stockmar |
| 2,697,903 | A | | 12/1954 | McKay |
| 2,925,870 | A | * | 2/1960 | Michelsen et al. ........... 172/146 |
| 3,115,193 | A | | 12/1963 | Pullen |
| 3,757,871 | A | * | 9/1973 | Maust et al. ................ 172/178 |
| 4,250,970 | A | | 2/1981 | Pfenninger et al. |
| 4,313,503 | A | * | 2/1982 | Good et al. ................. 172/140 |
| 4,361,191 | A | * | 11/1982 | Landoll et al. .............. 172/146 |
| 4,535,849 | A | * | 8/1985 | Dietrich, Sr. ................ 172/468 |
| 4,537,262 | A | | 8/1985 | van der Lely |
| 4,560,010 | A | | 12/1985 | Weichel |
| 4,625,809 | A | * | 12/1986 | Moynihan ................... 172/178 |
| 4,703,809 | A | | 11/1987 | Van den Ende |
| 4,703,810 | A | | 11/1987 | Meiners |
| 4,828,042 | A | | 5/1989 | Arnold |
| 4,865,132 | A | * | 9/1989 | Moore Jr. ................... 172/196 |
| 5,207,279 | A | * | 5/1993 | Nelson et al. ............... 172/140 |
| 5,303,779 | A | * | 4/1994 | Friggstad .................... 172/311 |
| 5,462,123 | A | * | 10/1995 | Harlan et al. ............... 172/454 |
| 5,474,135 | A | * | 12/1995 | Schlagel .................... 172/151 |
| 5,590,721 | A | | 1/1997 | Van Mill |
| 5,622,227 | A | | 4/1997 | McDonald |
| 5,632,343 | A | | 5/1997 | Gengler |
| 5,957,218 | A | * | 9/1999 | Noonan et al. .............. 172/239 |
| 6,076,611 | A | * | 6/2000 | Rozendaal et al. ............ 172/4 |
| 6,092,609 | A | * | 7/2000 | Jeffery et al. ............... 172/311 |
| 6,276,462 | B1 | * | 8/2001 | Dietrich, Sr. ................ 172/138 |
| 6,422,323 | B1 | * | 7/2002 | Dietrich, Sr. ................ 172/724 |
| 6,554,078 | B1 | * | 4/2003 | McDonald .................... 172/69 |
| 6,578,640 | B1 | * | 6/2003 | Ohlman et al. .............. 172/149 |

(Continued)

*Primary Examiner* — Robert Pezzuto
*Assistant Examiner* — Jamie L McGowan
(74) *Attorney, Agent, or Firm* — Rebecca Henkel; Sue Watson

(57) ABSTRACT

An agricultural tillage implement constructed to condition crop residue and cultivate the conditioned crop residue. The tillage implement includes a first residue conditioner and a second residue conditioner pivotably attached to a frame of the tillage implement. The first and second conditioners are movable independent of each other and of the frame such that an operator may raise and lower the first and second conditioners relative to the frame to change the depths of the conditioners.

16 Claims, 7 Drawing Sheets

U.S. PATENT DOCUMENTS 6,684,962 B1 * 2/2004 Lewallen .................. 172/311
6,698,525 B2 * 3/2004 McFarlane ................ 172/145
2003/0015327 A1 * 1/2003 Cox et al. .................. 172/452
2004/0149459 A1 * 8/2004 Powell et al. ............. 172/145

* cited by examiner

CROP RESIDUE AND SOIL CONDITIONING AGRICULTURAL IMPLEMENT

FIELD OF THE INVENTION

The present invention relates generally to agricultural implements, and in particular, to an implement configured to condition field crop residue in crossing directions, to incorporate the bi-directional conditioned crop residue with supporting soil, and to level the mixture of soil and conditioned crop residue.

BACKGROUND AND SUMMARY OF THE INVENTION

Agricultural economies depend upon efficient utilization of equipment, personnel, time, and money resources. Allocation of these resources is an important consideration in field and crop management. The duration of time that equipment and personnel spend on any given field dramatically affects the efficiency of crop production. Accordingly, one aspect of the present invention is to reduce the resources expended during field management.

Once a crop has been harvested, residual crop materials frequently remain on the field surface. Typically, these residual crop materials are incorporated within the soil profile of the field in an effort to maintain soil nutrient integrity. In particular, management of corn cropped fields commonly includes the incorporation of the residual corn stalks with field soil once the corn, and occasionally a portion of the stalk, has been harvested. Whereas some growers harvest a majority of the kernel, cob, and stalk material, others harvest only the kernel and discharge a majority of the chaff or cob and stalk materials onto the field. Regardless of the quantity of stalk material that is harvested, the subsequent preparation of a field requires incorporation of the stalk or crop residue with the field soil. It is generally understood that the size of the crop residue particles, as well as, the surface area of the crop residue exposed to the soil, affects crop residue decomposition. Specifically, reduced crop residue particle size and increased surface contact of the crop residue with adjoining soil improves crop residue decomposition.

Frequently, a crop residue conditioner, such as a stalk chopper, is pulled across the previously harvested field. The stalk chopper cuts the remaining stalks into smaller, more easily workable and degradable sized pieces. Frequently, one pass over relatively rigid crop residue such as corn stalks with the stalk chopper is insufficient to achieve the desired crop residue sizing. Additionally, the single pass of the stalk chopper inadequately conditions the crop residue that is generally aligned with the blades of the cutter. That is, crop residue that lies relatively perpendicular to the direction of travel passes through the stalk chopper with inadequate or no conditioning. This residue can lead to plow and other implement plugging or clogging during subsequent working of the field. Accordingly, many operators cross a field in a second working direction that is generally perpendicular to a first working direction to further condition the crop residue.

Such a process of conditioning crop residue increases an operator's time spent on any particular field, increases equipment wear and fuel consumption associated with any single working of the field, and detrimentally affects soil aeration due to the increased cultivation traffic on the field. Furthermore, insufficient single pass crop residue conditioning prevents subsequent operations, such as primary tillage, from being conducted contemporaneously with the initial crop residue-conditioning pass.

Commonly, after a field or a number of fields have been worked in crisscrossing directions with the residue conditioning implements, the operator must change implements to a primary tillage implement constructed to aerate a tillage profile and mix and/or bury the conditioned crop residue with the soil of the tillage profile. Once the crop residue has been mixed with the soil profile by the primary tillage implement, the operator again changes implements exchanging the primary tillage implement for another tillage implement constructed to level the cultivated tillage profile. Accordingly, traditional incorporation of crop residue with a tillage profile and preparation for subsequent field conditioning requires extensive field working with variable implements. Furthermore, each of the crop residue conditioner, the primary tillage implement, and the leveling implement are operated across the fields at different elevations. That is, where the crop residue-conditioning implement generally operates at an upper surface level of the field, the primary tillage implement is generally operated at an elevation of approximately 8 to 14 inches below the soil surface. Similarly, the leveling implement is generally operated in a range of approximately 3 to 6 inches below an upper surface of the primary tillage profile. Accordingly, simple gang connection of a plurality of individual devices is impractical to achieve efficient single pass field working.

Therefore, it would be desirable to provide a primary tillage system capable of conditioning crop residue in crossing directions, incorporating the conditioned crop residue into a tillage profile, and leveling the tillage profile for subsequent field weathering, planting or other conditioning.

In accordance with the present invention, a crop residue conditioning and incorporation implement is provided. The implement includes a frame extending along a longitudinal axis and supported above a supporting surface. The frame has a forward end connectable to a tow vehicle and a rearward end. A first conditioner is pivotably connected to the frame for conditioning a crop residue. The first conditioner is movable between a first retracted position and a second extended position independent of the frame. A second conditioner is pivotably connected to the frame at a location longitudinally spaced from the first conditioner for conditioning the crop residue. The second conditioner is movable between a first retracted position and a second extended position independent of the frame The implement may also include a first tillage implement attached to the frame at a location between the first and second conditioners. The first tillage implement is biased toward the supporting surface. A second tillage implement is attached to the frame at a location rearward of the second conditioner. The second tillage implement is engageable with the supporting surface for leveling the supporting surface. It is contemplated that the first and second conditioners are independently movable relative to each other.

The first conditioner may be a stalk chopper that includes a plurality of blades oriented generally transverse to a pulled direction. The second conditioner includes first and second cutting disks positioned on opposite sides of the longitudinal axis. Each cutting disk includes a radially outer edge lying in plane that intersects the longitudinal axis at an acute angle. The frame is movable in a first direction and the radially outer edges of first and second cutting disks are oriented in a crossing direction with respect to the first direction. The cutting disks can be either individually mounted or mounted in a gang configuration, can be straight or concave in shape, and can be run at an acute angle intersecting or parallel to the longitudinal axis.

The implement may further include a wheel system pivotably connected to the frame for supporting the frame above the supporting surface. The wheel system includes a wheel and an actuator interconnecting the wheel system to the frame. The actuator is movable between a retracted position wherein the first conditioner engages the supporting surface and an extended position wherein the first conditioner is spaced from the supporting surface.

A leveling assembly is operatively connected to the frame. The leveling assembly pivots the frame on the wheel between a first level position wherein the frame is level with the supporting surface and a second level position. The implement may also include at least one wing pivotably supported by the frame. The wing is movable between a transport position and a non-transport position.

In accordance with a further aspect of the present invention, a primary tillage system is provided. The system includes a frame extending along a longitudinal axis and being supportable above a supporting surface. A stalk chopper is pivotably attached to the frame. The stalk chopper includes a central hub and a plurality of circumferentially spaced blades projecting radially from the hub. A cutting disk is pivotably attached to the frame aft of the stalk chopper. The cutting disk is positionable independent of the frame. A plurality of tillage shanks are attached to the frame aft the cutting disk. Each tillage shank is indexed relative to the cutting disk. A harrow is also pivotably attached to the frame aft the plurality of tillage shanks. The harrow is positionable independent of the frame and is indexed relative to the plurality of tillage shanks.

Each of the plurality of tillage shanks are offset from an axis of travel of the cutting disk to prevent soil clogging between adjacent tillage shanks. The harrow includes a plurality of soil manipulators. Each soil manipulator is offset from an axis of travel of each of the plurality of tillage shanks. The stalk chopper is positionable independent of the frame. A wheel assembly is pivotably connected to the frame and includes a wheel. The wheel assembly is movable between a first position wherein the plurality of tillage shanks engages the supporting surface and a second position wherein the plurality of tillage shanks are disengaged from the supporting surface. The harrow is selected from a group including a plurality of disks, a plurality of tines, at least one rolling basket, and a plurality of coulters. The cutting disk includes a radially outer edge free of serrations.

In accordance with a still further aspect of the present invention, an agricultural implement is provided. The implement includes a frame extending along a longitudinal axis and being supportable above a supporting surface. A stalk chopper is pivotably connected to the frame and has a plurality of blades for cutting a crop residue in a first direction. First and second sets of cutting disks are pivotably connected to the frame. Each set of cutting disks include a plurality of individual disks. A cutting disk actuator moves at least one set of the cutting disks between a first raised position and a second lowered position. The cutting disk actuator moves the at least one set of the cutting disks independent of the frame. A leveling tool is pivotably connected to the frame aft of the first and second sets of cutting disks. A leveling tool actuator moves the leveling tool between a first raised position and a second lowered position. The leveling tool actuator moves the leveling tool independent of the frame.

The first and second sets of cutting disks are positioned on opposite sides of the longitudinal axis. Each cutting disk of the first and second sets of cutting disks include a radially outer edge lying in plane that intersects the longitudinal axis at an acute angle. The frame is movable in a first direction and the radially outer edges of first and second cutting disks are oriented in a crossing direction with respect to the first direction.

A wheel system is pivotably connected to the frame for supporting the frame above the supporting surface. The wheel system including a wheel and an actuator interconnecting the wheel system to the frame. The actuator is movable between a retracted position wherein the first and second sets of cutting disks engage the supporting surface and an extended position wherein the first and second sets of cutting disks are spaced from the supporting surface. A leveling assembly is operatively connected to the frame. The leveling assembly pivots the frame on the wheel between a first level position for operation wherein the frame is level with the supporting surface and a second level position for transport. At least one wing may be pivotably supported by the frame. The wing is movable between a transport position and a non-transport position.

Other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
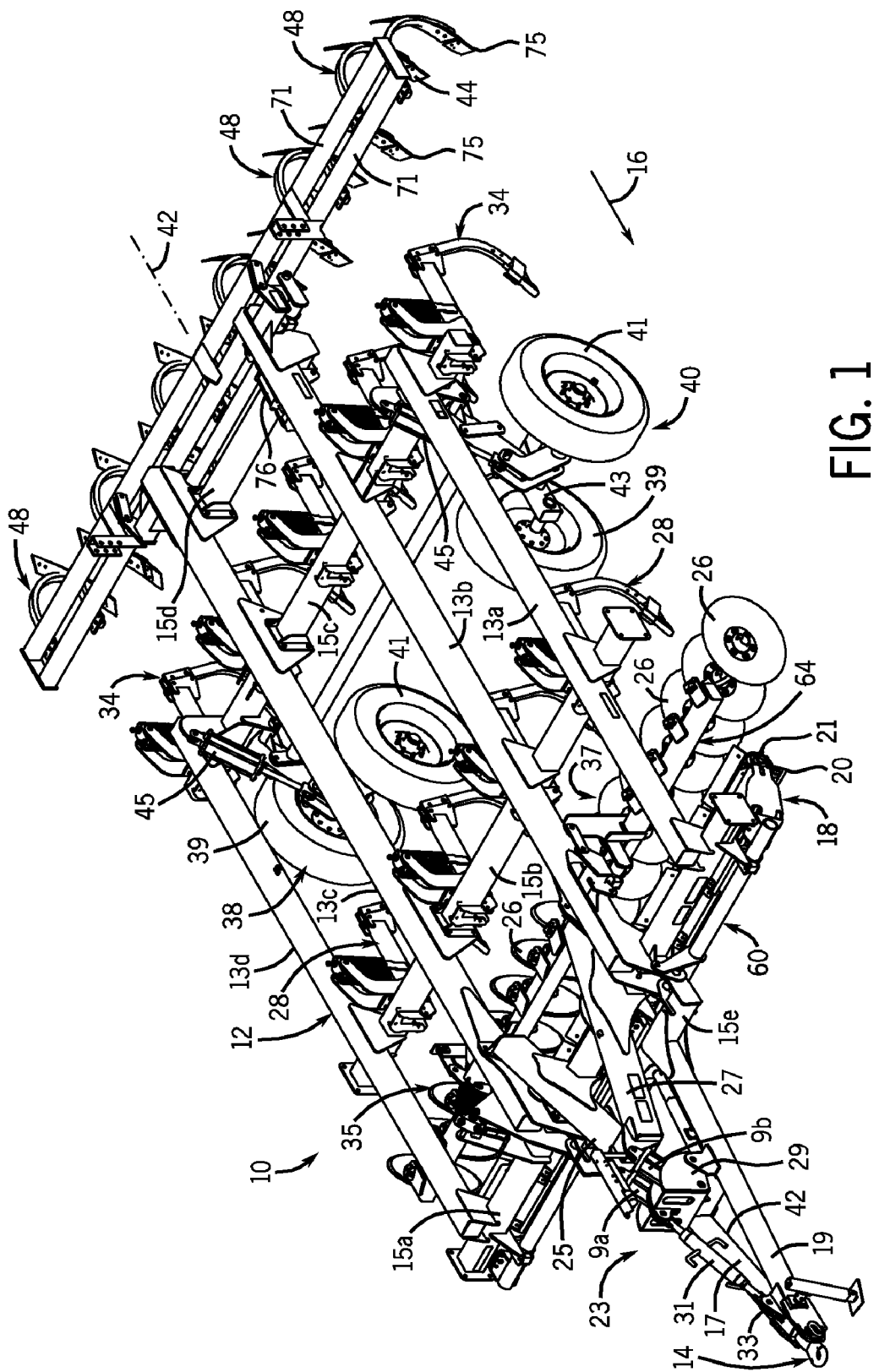
FIG. 1 is an isometric view of a primary tillage system according to the present invention.
Figure 2:
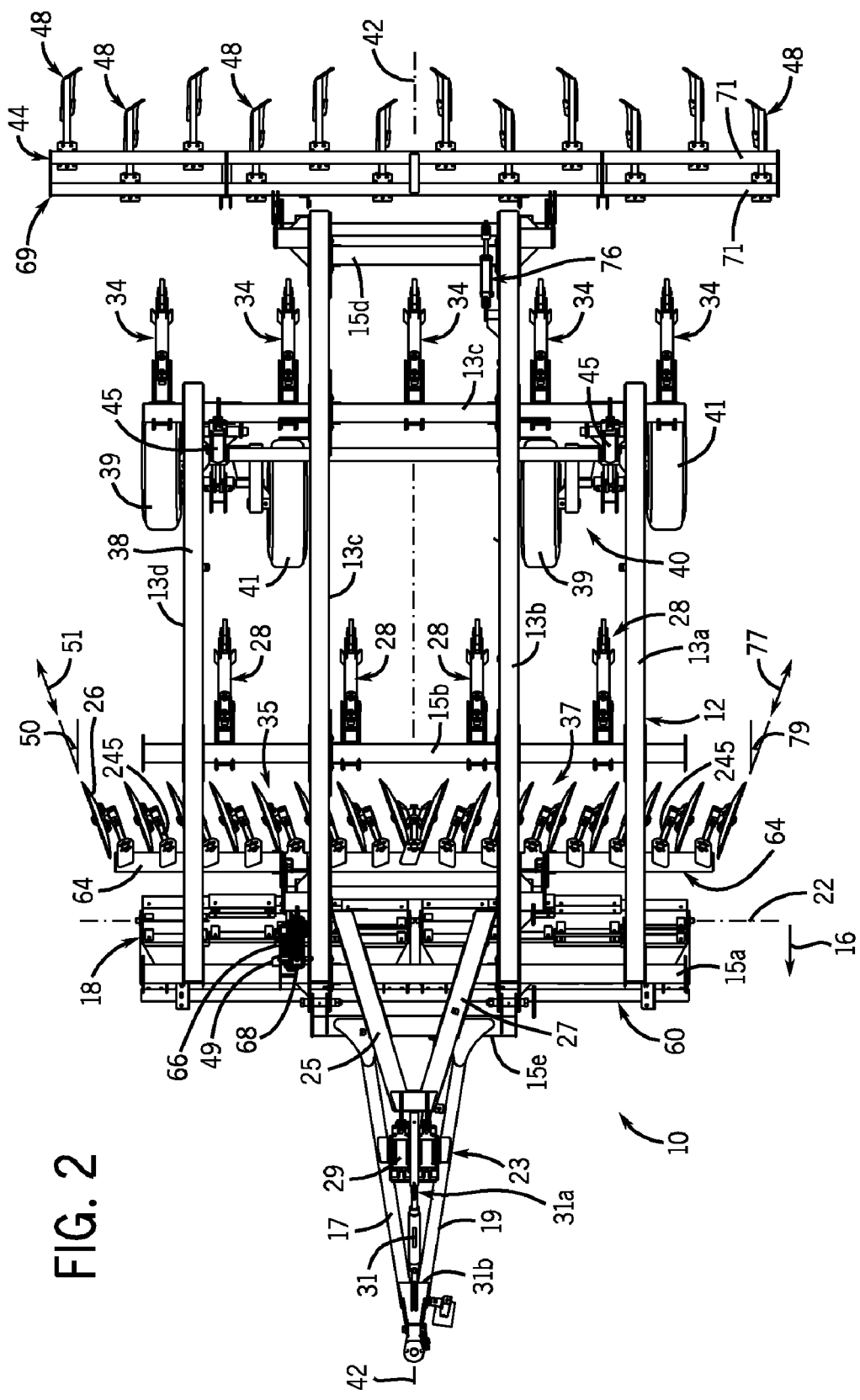
FIG. 2 is a top view of the primary tillage system shown in FIG. 1.
Figure 3:
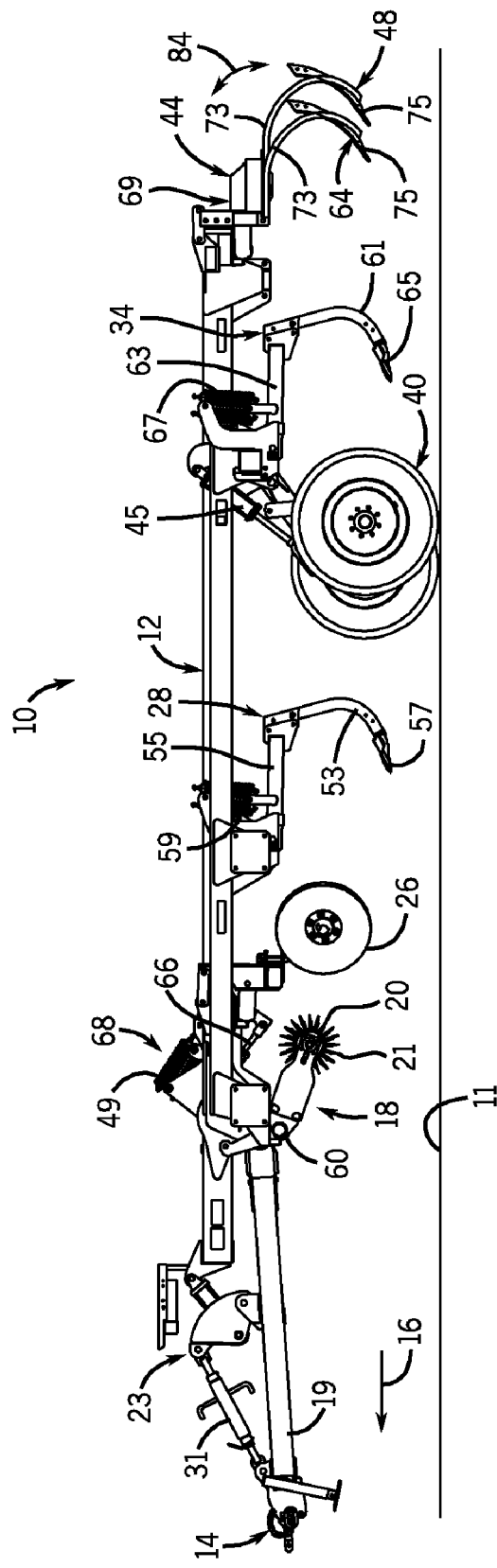
FIG. 3 is a side-elevational view of the primary tillage system shown in FIG. 1.

Referring to FIGS. 1-3, a crop residue conditioning and incorporation implement, a primary tillage system, or a tillage device in accordance with the present invention is generally designated by the reference numeral 10. Tillage device 10 includes frame 12 extending along central axis 42 and has a first end incorporating hitch 14 that is adapted to operatively connect tillage device 10 with a drawbar of tow vehicle 128, FIG. 7.

Frame 12 includes a plurality of spaced longitudinally frame elements 13a-13d that are generally parallel to central axis 42 and that are interconnected by a plurality of cross frame members 15a-15c, transverse thereto. The rearward ends of frame elements 13b and 13c are interconnected by rear cross frame member 15d and the forward ends of frame elements 13b and 13c are interconnected by cross frame member 15e. As shown, hitch 14 is connected to forward cross frame member 15e by first and second hitch frame members 17 and 19, respectively. More specifically, the first ends of first and second hitch frame members 17 and 19, respectively, are operatively connected to hitch 14. The second ends of first and second hitch frame members 17 and 19, respectively, diverge from each other and are operatively connected to cross frame member 15e.

Hitch 14 is further connected to frame 12 by a leveling assembly, generally designated by the reference numeral 23. Leveling assembly 23 includes first and second support arms 25 and 27, respectively, interconnect to corresponding frame element 13b and 13c, respectively. Leading ends 25a and 27a of support arms 25 and 27, respectively, are pivotably connected to pivot mechanism 29 which is pivotably supported on first and second hitch frame members 17 and 19, respectively. Turnbuckle 31 has a first end 31a pivotably connected to pivot mechanism 29 and a second end 31b pivotably connected to the leading ends of first and second hitch frame members 17 and 19, respectively, through mounting bracket 33. Hydraulic cylinders 9a and 9b are operatively connected to an actuator switch (not shown) provided in the cab of tow vehicle 128, FIG. 7, that controls movement of hydraulic cylinders 9a and 9b between extended and retracted positions.

It is intended for leveling assembly 23 to maintain the levelness of frame 12 with respect to a supporting surface, such as field surface 11. More specifically, under operator control, leveling assembly 23 raises and lowers the leading end of frame 12 relative to field surface 11 about wheel assemblies 38 and 40. The position of the leading end of frame 12 is adjusted by extending or retracting hydraulic cylinders 9a and 9b under operator control.

As is conventional, frame 12 is supported above field surface 11, by first and second sets of wheel assemblies 38 and 40, respectively. As best seen in FIG. 2, wheel assemblies 38 and 40 include corresponding sets of offset wheels 39 and 41, respectively. First wheel assembly 38 of tiller device 10 is offset from a first side of central axis 42. Likewise, second wheel assembly 40 of tiller device 10 is offset from a second side of central axis 42. It can be appreciated that tillage device 10 is constructed to move along field surface 11 in a working or travel direction, indicated by arrow 16, to cultivate the field being traversed.

Wheels 39 and 41 of each wheel assembly 38 and 40 are mounted on arms 43 that are pivotable with respect to frame 12. More specifically, arms 43 are coupled to frame 12 through hydraulic cylinder 45 and by any suitable linkage 47 that raises and lowers arms 43 upon cylinder actuation and retraction. It is contemplated to operatively connect hydraulic cylinder 45 to an actuator switch (not shown) provided in the cab of the tow vehicle that controls movement of hydraulic cylinder 45 between an extended position and a retracted position. Wheels 39 and 41 can be raised between a 1) lowermost position; 2) a partially raised position to reduce the penetration of shank assemblies 28 and 34, hereinafter described, or 3) a fully raised position for transport. The typical working depth will vary from machine to machine and most often will be between 7 and 8 inches. A depth indicator (not shown) may be provided for a quick reference on the operating depth of the implements.

A first crop residue conditioner, preferably stalk chopper 18, is pivotably coupled to frame member 15a of frame 12 proximate to hitch 14. Stalk chopper 18 includes central hub 21 extending along and being rotatable about a first axis, indicated by axis 22. Axis 22 is generally transverse to device travel direction 16. A plurality of blades 20 are circumferentially spaced about and project radially from central hub 21. Stalk chopper 18 includes arms extending from opposite ends thereof that are operatively connected to stalk chopper subframe 60 which, in turn, are pivotably connected frame member 15a of frame 12 A plurality of blades 20 are circumferentially spaced about and project radially from central hub 21

Figure 7:
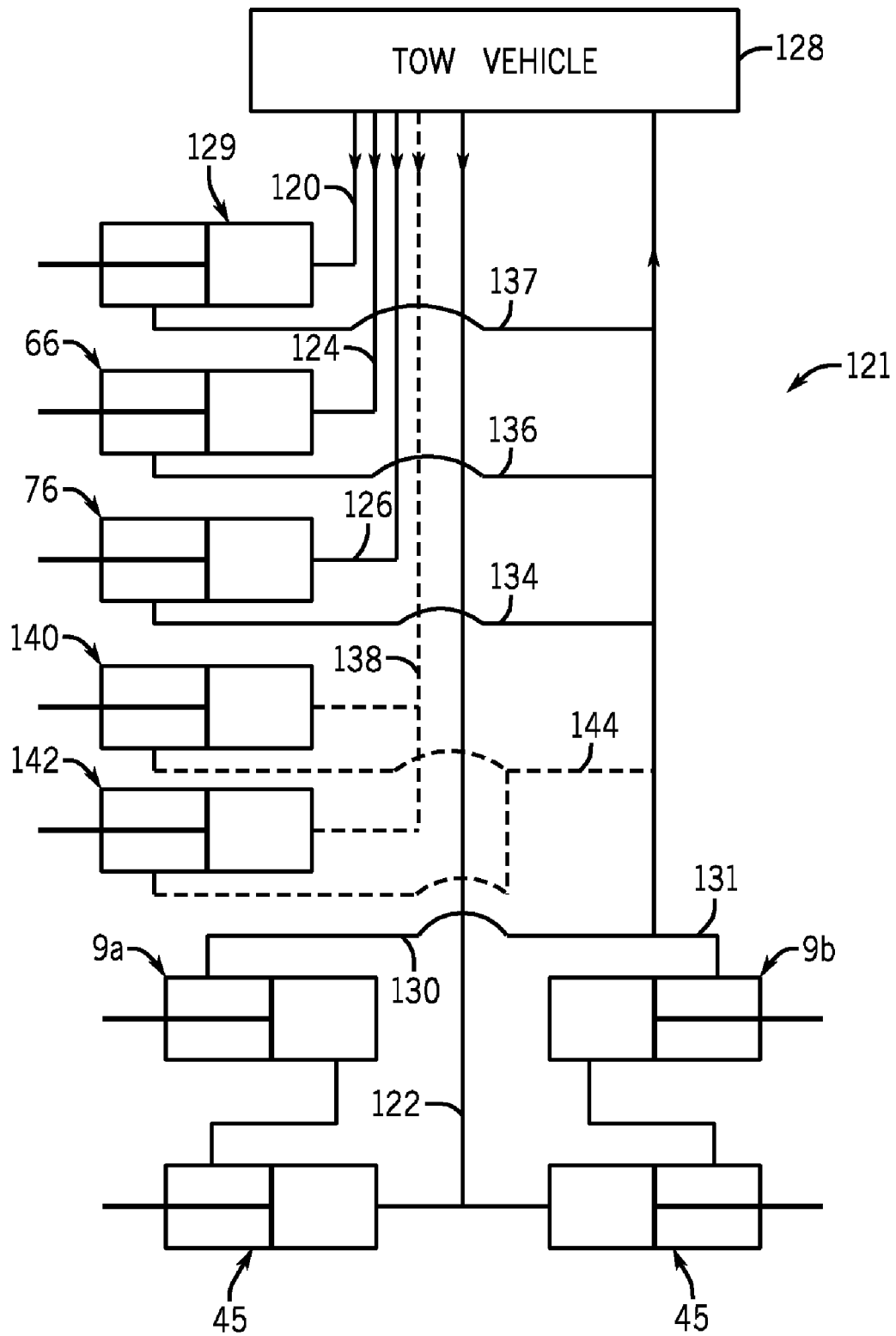
FIG. 7 schematically illustrates a control system for the primary tillage systems shown in FIGS. 1-6.

In addition, it is contemplated to operatively connect stalk chopper 18 to fame 12 via a spring system and/or a hydraulic cylinder arrangement, such as hydraulic cylinder 129, FIG. 7. The spring system and/or hydraulic cylinder arrangement provide dynamic stability to stalk chopper 18 during operation. As a result, the downward pressure on stalk chopper 18 is optimized without restricting upward movement of stalk chopper 18 when in engagement with an obstruction. Further, a hydraulic cylinder arrangement would allow stalk chopper 18 to be raised when not in use or when adverse conditions warrant. It is contemplated to operatively connect the hydraulic cylinder of the hydraulic cylinder arrangement to an actuator switch (not shown) provided in the cab of tow vehicle 128 that controls movement of hydraulic cylinder between an extended position and a retracted position, and hence, movement of the stalk chopper between its raised and lowered positions.

A second crop residue conditioner, such as first and second sets of cutting disks 35 and 37, is pivotably connected to cutting disk subframe 64 aft or rearward of stalk chopper 18. Cutting disk actuator 66 and impact arrestor system 68 also interconnect cutting disk subframe 64 and cross frame member 15a of frame 12. Cutting disk actuator 66 permits cutting disk subframe 64, and hence first and second sets of cutting disks 35 and 37, respectively, to be raised and lowered relative to frame 12 to change the cutting depth for a particular cutting depth setting. The cutting depth is adjusted by extending or retracting the hydraulic cylinder of cutting disk actuator 66. It is contemplated to operatively connect hydraulic cylinder of the cutting disk actuator 66 to an actuator switch (not shown) provided in the cab of the tow vehicle that controls movement of hydraulic cylinder of the cutting disk actuator 66 between its extended and retracted positions.

Impact arrestor system 68 includes carrier springs 49 that assert a yieldable downward pressure on cutting disk subframe 64, and hence, on first and second sets of cutting disks 35 and 37, respectively. As such, carrier springs 49 permit limited movement of first and second sets of cutting disks 35 and 37, respectively, relative to frame 12 to accommodate variations in ground topology or to deflect about immovable obstructions, such as large stones, which may be lying in the travel path of tillage device 10.

Each set of cutting disks 35 and 37, respectively, are provided on opposite sides of central axis 42 of frame 12. Each set of cutting disks 35 and 37 includes a plurality of disks 26 rotatably support on corresponding arms 45 which, in turn, are interconnected to cutting disk subframe 64. It is intend that the plurality of disks 26 include radially outer edges that ride on field surface 11 during a tillage operation. Each disk 26 has a concave surface that is directed away from central axis 42 of frame 12 and may be individually mounted or as part of a gang assembly.

The radially outer edges of disks 26 of first set of cutting disks 35 lie in corresponding planes that are generally parallel to each other and are at a predetermined acute angle to central axis 42 of frame 12. Similarly, the radially outer edges of disks 26 of second set of cutting disks 37 lie in corresponding planes that are generally parallel to each other and are at a predetermined acute angle to central axis 42 of frame 12. As best seen in FIG. 2, disks 26 of first set of cutting disks 35 and disks 26 of second set of cutting disks 37 are in a crossing direction relative to travel direction 16. It is noted that disks 26 of the first and second sets of cutting disks 35 and 37, respectively, may be individually mounted or in a gang configuration, and may be replaced with coulter disks when desired or when field conditions so dictate.

A first plurality of shank assemblies 28 are spaced along and depend from frame member 15b of frame 12 at a location rearward first and second sets of cutting disks 35 and 37, respectively, relative to travel direction 16. Each shank assembly 28 includes parabolic shank 53 having a first end mounted to a longitudinally extending beam 55. Ripper point 57 is mounted to the second, bottom end of shank 53. Beam 55 is pivotably mounted to frame member 15b of frame 12 and biased downwardly by springs 59.

A second plurality of shank assemblies 34 are spaced along and depend from frame member 15c at a location rearward of frame member 15c of frame 12 relative to travel direction 16. Each shank assembly 34 includes parabolic shank 61 having a first end mounted on a longitudinally extending beam 63. Ripper point 65 is mounted to the second, bottom end of shank 61. Beam 63 is pivotably mounted to frame member 15c of frame 12 and biased downwardly by springs 67.

The second plurality of shank assemblies 34 are indexed relative to the lines of travel of ripper points 57 of the first plurality of shank assemblies 28 to effect a so-called "split the middle" ripper point pattern, which provides for uniform ridges to be formed as tillage device 10 travels over field surface 11. The first plurality of shank assemblies takes a full cut of the soil and leaves alternating strips of untilled soil. The second plurality of shank assemblies 34 till the untilled strips left by the first plurality of shank assemblies 28. As described, by laterally offsetting the first and second pluralities of shank assemblies 28 and 34, respectively, a greater path of soil may be tilled with each pass of tillage device 10. It is noted that the first and second pluralities of shank assemblies 28 and 34, respectively, may have a number of different constructions and configurations without deviating from the scope of the present invention.

Harrow section 44 is pivotably attached frame elements 13b and 13c at location rearwardly of and adjacent to cross frame member 15c of frame 12. Harrow section 44 includes a harrow subframe 69 supporting a plurality of leveling tools 48. Harrow subframe 69 includes a pair of support beams 71 transverse to central axis 42 of tillage device 10. Each leveling tool 48 includes a generally C-shaped arm 73 suspended from an associated support beam 71. Leveling shank 75 is mounted to the second, bottom end of arm 73. It is intended for leveling shanks 75 to be indexed to the first and second pluralities of shank assemblies 28 and 34, respectively, in order to provide proper leveling of field surface 11.

Harrow subframe 69 is also interconnected to frame element 13b of frame 12 by harrow actuator 76. Harrow actuator 76 may be used to position harrow subframe 69, and hence leveling tools 48, relative to frame 12. More specifically, harrow actuator 76 permits harrow subframe 69, and hence leveling tools 48, to be raised and lowered relative to frame 12 to change the positions of leveling tools 48 with respect to field surface 11. The positions of leveling tools 48 are adjusted by extending or retracting the hydraulic cylinder of harrow actuator 76. It is contemplated to operatively connect the hydraulic cylinder of harrow actuator 76 to an actuator switch (not shown) provided in the cab of the tow vehicle that controls movement of the hydraulic cylinder of harrow actuator 76 between its extended and retracted positions.

It is contemplated to provide wing mounting flanges at terminal ends of cross frame member 15b of frame 12 in order to connect optional wing sections to tillage device 10. Understandably, the optional wing sections may be equipped with implements similar to those of tillage device 10. As a result, the optional wing sections allow tillage device 10 to provide a wider worked area per pass over field surface 11.

In operation, hitch 14 of tillage device 10 is interconnected in a conventional manner to a tow vehicle. Wheels 39 and 41 of wheel assemblies 38 and 40 are positioned by an operator to a desired position, namely, 1) its lowermost position; 2) the partially raised position to reduce the penetration of shank assemblies 28 and 34 or 3) a fully raised position for transport. Under operator control, leveling assembly 23 raises and lowers the leading end of frame 12 relative to field surface 11 about wheel assemblies 38 and 40 so as to level frame 12.

In order to position stalk chopper 18 to frame 12, an operator engages the actuator switch in the cab of the tow vehicle so as to move the hydraulic cylinder of the hydraulic cylinder arrangement (if present) to a desired position, as heretofore described. Similarly, the operator engages the corresponding actuator switch in the cab of the tow vehicle so as to actuate the cutting disk actuator 66 and move the first and second sets of cutting disks 35 and 37, respectively, to a desired cutting depth. Finally, the operator engages the corresponding actuator switch in the cab of the tow vehicle so as to actuate the harrow actuator 76 and change the positions of leveling tools 48 with respect to field surface 11, as heretofore described.

The independent positioning of stalk chopper 18, the first and second sets of cutting disks 35 and 37, respectively, and harrow section 44 allows an operator to configure tillage device 10 for a plurality of working conditions. That is, the independent positioning of each of the stalk chopper, cutting disk, and harrow section relative to a field surface, allows the operator to control the operating or penetration depth of each individual implement of tillage device 10.

Once frame 12 and the implements of tillage device 10 are properly positioned by an operator, it is contemplated for the tow vehicle to tow tillage device 10 over field surface 10 in travel direction 16. As tillage device 10 traverses a field in travel direction 16, stalk chopper 18 rotates thereby severing crop residue passed thereunder. Accordingly, stalk chopper 18 provides a first conditioning of residual crop materials. As tillage device 10 continues to travel in direction 16, disks 26 of the first and second sets of cutting disks 35 and 37, respectively, provide a second conditioning, or cutting of the crop residue. Disks 26 of the first and second sets of cutting disks 35 and 37, respectively, condition the crop residue in a crossing direction, indicated by arrows 51 and 77, respectively, at corresponding predetermined acute angles 50 and 79, respectively, to central axis 42 of frame 12. As heretofore described, the first and second sets of cutting disks 35 and 37, respectively, include equal numbers of disks 26 facing in opposite directions to reduce the transverse travel direction forces associated with movement in tillage device along travel direction 16.

As tillage device 10 continues to move in travel direction 16, the twice-conditioned crop residue is mixed with a desired depth of the soil profile by a first plurality of shank assemblies 28. Ripper points 57 of the first plurality of shank assemblies 28 fracture and upturn a desired depth of the soil profile and mix the two-direction conditioned crop residue with the upturned soil materials. Incorporation of the soil residue with the material of the soil profile beneficially aerates the soil for subsequent planting or field conditioning and enhances soil to crop residue contact, thereby encouraging crop residue decomposition.

Similarly, as tillage device 10 continues to move in travel direction 16, the second plurality of shank assemblies 34 till the untilled strips left by the first plurality of shank assemblies 28. As heretofore described, by laterally offsetting the first and second pluralities of shank assemblies 28 and 34, respectively, a greater path of soil is tilled with each pass of tillage device 10. In addition, it can be appreciated that the construction of tillage device 10 allows for the generally uniform soil tillage and crop residue incorporation across the width thereof.

After the conditioned crop residue has been incorporated with the material of the soil profile, leveling shanks 75 of the first and second pluralities of shank assemblies 28 and 34, respectively, of harrow section 44 further fractures the upturned soil materials and levels the soil materials for subsequent field operations such as planting or other conditioning, such as fertilizing. As heretofore described, leveling shanks 75 are indexed to the first and second pluralities of shank assemblies 28 and 34, respectively, in order to provide proper leveling of field surface 11.

Figure 4:
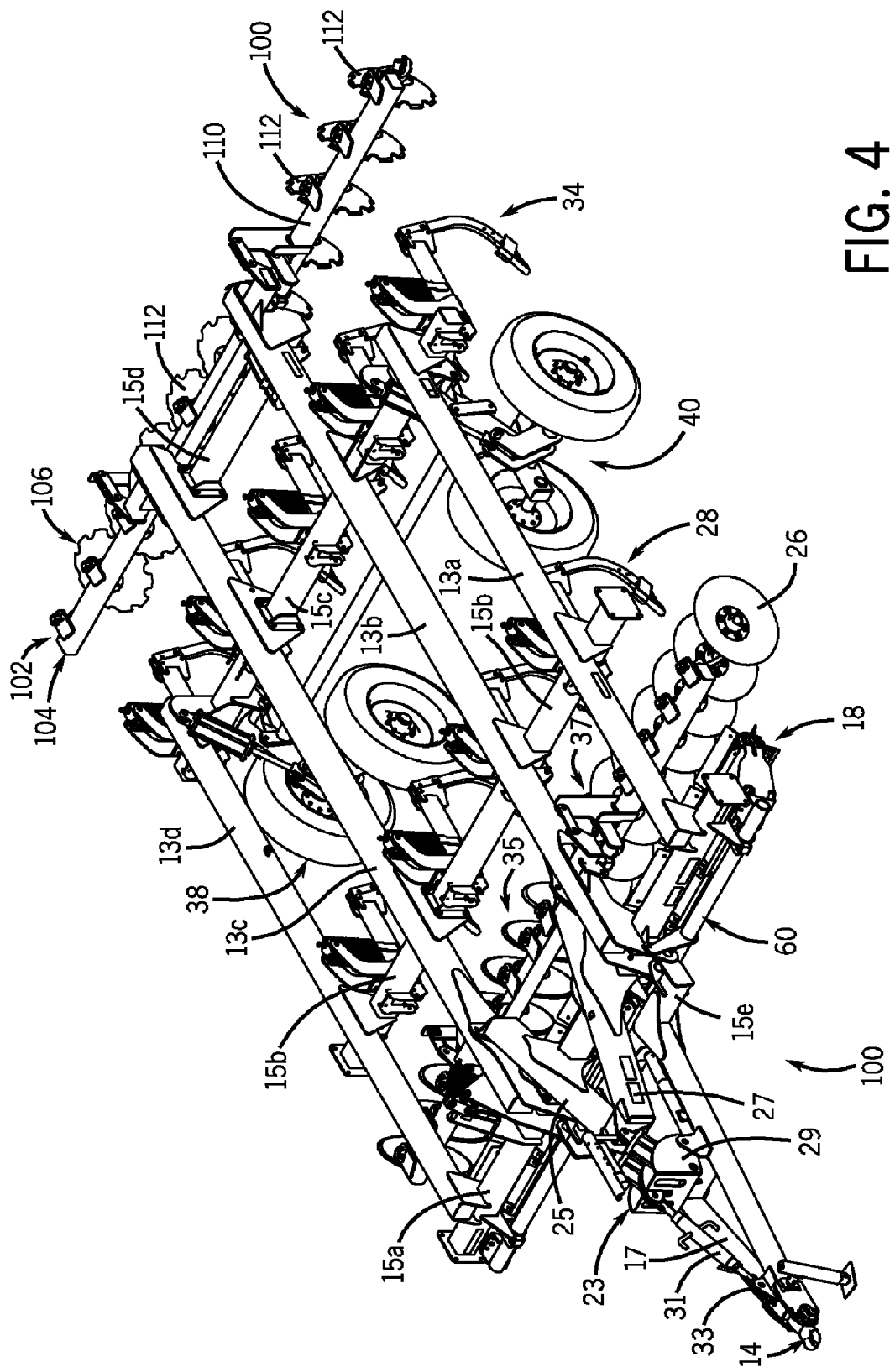
FIG. 4 is an isometric view of a primary tillage system according to an alternate embodiment of the present invention.
Figure 5:
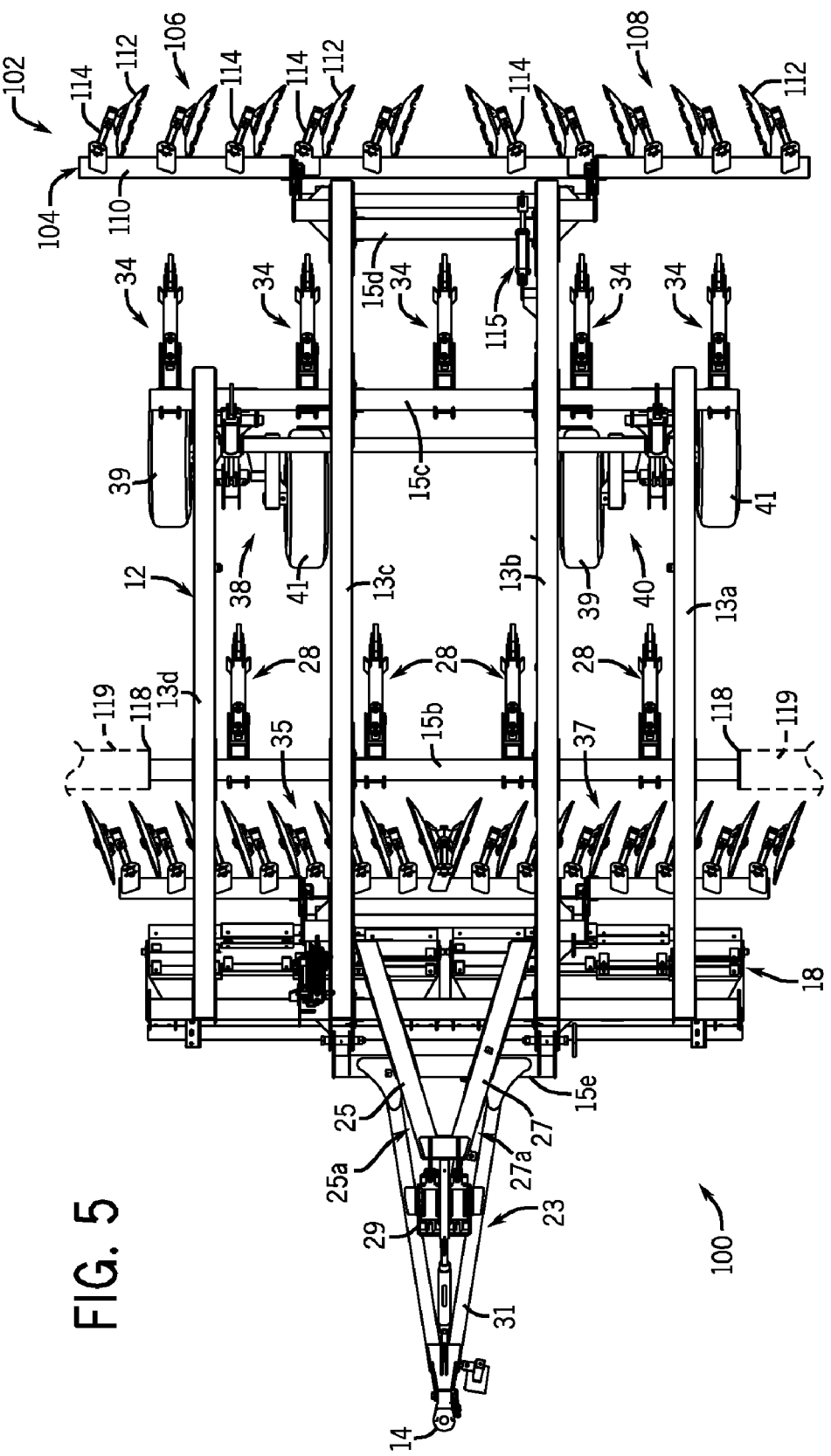
FIG. 5 is a top-plan view of the primary tillage system shown in FIG. 4.
Figure 6:
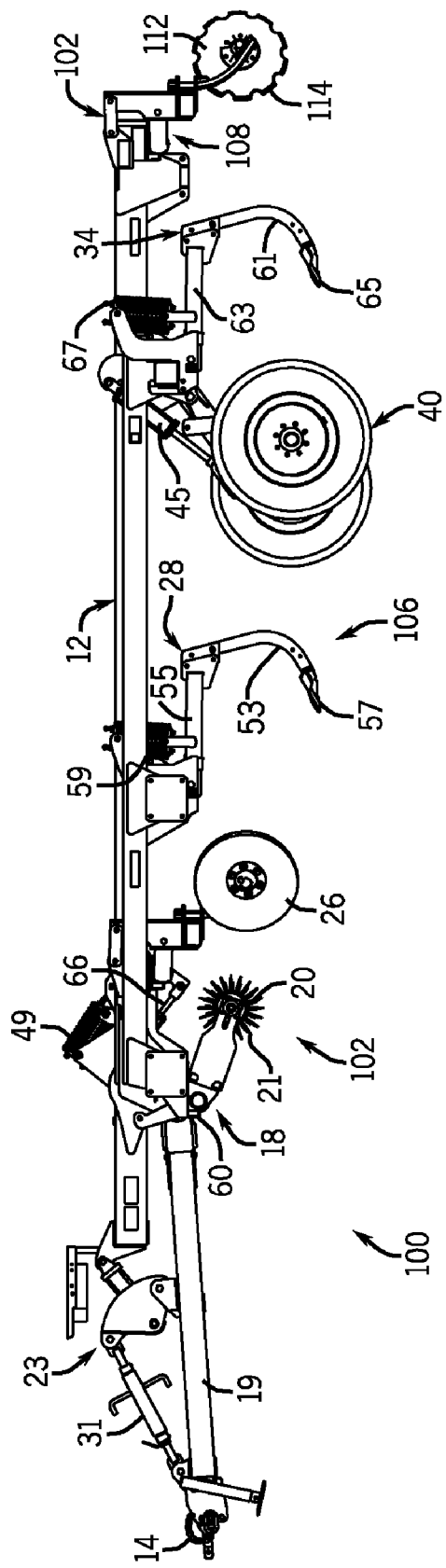
FIG. 6 is a side elevational view of the primary tillage system shown in FIG. 4.

Referring to FIGS. 4-6, an alternate embodiment of a tillage device in accordance with the present invention is generally designated by the reference numeral 100. It can be appreciated that tillage device 100 is substantially identical in structure to tillage device 10, heretofore described. As such, the prior description of tillage device 10 is understood to describe tillage device 10 except as hereinafter provided.

Tillage device 100 includes leveling implement 102 unlike harrow section 44 of tillage device 10. Leveling implement 102 is pivotably attached frame elements 13b and 13c at location rearwardly of and adjacent to cross frame member 15d of frame 12. Leveling implement 102 includes a leveling subframe 104 supporting first and second sets of leveling disks 106 and 108, respectively. Leveling subframe 104 includes a support beam 110 transverse to central axis 42 of tillage device 100.

Each set of leveling disks 106 and 108 is provided on opposite sides of central axis 42 of frame 12 and includes a plurality of leveling disks 112 rotatably support on corresponding arms 114 which, in turn, are interconnected to leveling subframe 104. It is intended that the plurality of leveling disks 112 include serrated radially outer edges that ride on field surface 11 during a tillage operation. Each leveling disk 112 has a concave surface that is directed away towards central axis 42 of frame 12.

It is noted that the radially outer edges of leveling disks 112 of first set of leveling disks 106 lie in corresponding planes that are generally parallel to each other at a predetermined acute angle to central axis 42 of frame 12. Similarly, the radially outer edges of leveling disks 112 of second set of leveling disks 108 lie in corresponding planes that are generally parallel to each other at a predetermined acute angle to central axis 42 of frame 12. As best seen in FIG. 5, leveling disks 112 of first set of leveling disks 106 and leveling disks 112 of second set of leveling disks 108 are in a non-crossing direction relative to travel direction 16.

Leveling subframe 104 is also interconnected to frame element 13b of frame 12 by leveling actuator 115. Leveling actuator 115 may be used to position leveling subframe 104, and hence leveling disks 112, relative to frame 12. More specifically, leveling actuator 115 permits leveling subframe 104, and hence leveling disks 112, to be raised and lowered relative to frame 12 to change the positions of leveling disks 112 with respect to field surface 11. The positions of leveling disks 112 are adjusted by extending or retracting the hydraulic cylinder of leveling actuator 115. It is contemplated to operatively connect the hydraulic cylinder of leveling actuator 115 to an actuator switch (not shown) provided in the cab of the tow vehicle that controls movement of the hydraulic cylinder of leveling actuator 115 between its extended and retracted positions.

Referring to FIG. 5, it is contemplated to provide wing mounting flanges 118 at terminal ends of cross frame member 15b of frame 12 in order to connect optional wing sections 119 to tillage device 100. Understandably, optional wing sections 119 may be equipped with implements similar to those of tillage device 100. As a result, tillage device 100 would provide a wider worked area per pass over field surface 11.

Referring to FIG. 7, a schematic representation of an exemplary control system 121 for tillage devices 10 and 100 is generally designated by the reference numeral 121. Control system 121 includes a plurality of actuator switches housed in tow vehicle 128 that control communication of corresponding implement actuators with a hydraulic fluid source within tow vehicle 128. By way of example, input line 120 is operatively connected to hydraulic cylinder 129 that operatively connects the stalk chopper 18 to frame 12; input line 122 is operatively connected to hydraulic cylinders 45 of wheel assemblies 38 and 40 which, in turn, are operatively connected to hydraulic cylinders 9a and 9b of leveling assembly 23; input line 124 is operatively connected to hydraulic cylinder of the cutting disk actuator 66; and input line 126 is operatively connected to hydraulic cylinder of harrow actuator 76 (or the hydraulic cylinder of leveling actuator 115 for tillage device 100). In addition, hydraulic cylinders 9a and 9b of leveling assembly 23, and hence hydraulic cylinders 45 of wheel assemblies 38 and 40, are operatively connected to the fluid source within tow vehicle 128 through return lines 130 and 131, respectively; the hydraulic cylinder of cutting disk actuator 66 is operatively connected to the fluid source with tow vehicle 128 through return line 134; the hydraulic cylinder of harrow actuator 76 (or the hydraulic cylinder of leveling actuator 115 for tillage device 100) is operatively connected to the fluid source with tow vehicle 128 through return line 136; and hydraulic cylinder 129 of stalk chopper 18 is operatively connected to the fluid source within tow vehicle 128 through return line 137. As heretofore described, it can be appreciated that actuation of an operator selected actuator switch housed in tow vehicle 128 controls the fluid flow to and from corresponding hydraulic cylinders through the input and return lines, and hence, movement of a corresponding hydraulic cylinder between its retracted and extended positions.

In those applications where tillage devices 10 and 100 include foldable wing sections 119, control system 121 may include an actuator switch housed in tow vehicle 128 that controls communication of corresponding wing section actuators 140 and 142 with the hydraulic fluid source within tow vehicle 128. More specifically, input line 138 and return line 144 are operatively connected to the hydraulic cylinders of wing section actuators 140 and 142. It is contemplated that actuation of an operator selected actuator switch housed in tow vehicle 128 controls the fluid flow to and from corresponding hydraulic cylinders of wing section actuators 140 and 142 through the input and return lines 138 and 144, respectively, and hence, movement of the hydraulic cylinders between their retracted and extended positions. It can be appreciated that the hydraulic cylinders of wing actuators 140 and 142 extend and/or retract the wing sections 119.

It can be appreciated control system 121 may utilize mechanical, pneumatic, or electrical controls, instead of the hydraulic system disclosed herein, without deviating from the scope of the present invention. For example, the hydraulic cylinder heretofore described may be replaced by electrical devices, such as motors; pneumatic devices, such as pneumatic rams; or other mechanical means, such as manually adjustable linkages or assemblies.

Various modes of carrying out the invention are contemplated as being within the scope of the following claims particularly pointing out and distinctly claiming the subject matter that is regarded as the invention.

The invention claimed is:

1. A crop residue conditioning and incorporation implement comprising:
   a frame extending along a longitudinal axis and supported above a supporting surface, the frame having a forward end connectable to a tow vehicle and a rearward end, the frame having a plurality of spaced longitudinally frame members, and the frame having a forward end connected to a tow vehicle and the rearward end;
   a first conditioner pivotably connected to a first transverse frame member for conditioning a crop residue, the first conditioner movable between a first retracted position and a second extended position independent of the frame, the first conditioner including a central hub extending along and being rotatable about a first axis transverse to the crop residue conditioning and incorporating implement travel direction, a plurality of blades circumferentially spaced about and project radially from the central hub, the first crop residue conditioner including arms extending from opposite ends thereof connected to a stalk chopper subframe pivotably connected to the first transverse frame member;
   a second conditioner pivotably connected to the frame at a location longitudinally spaced from the first conditioner for conditioning the crop residue, the second conditioner connected to a second transverse frame member and movable between a first retracted position and a second extended position independent of the frame, the second conditioner having first and second set of cutting disks positioned in a single line on the second transverse frame member which is perpendicular to the longitudinal axis of the frame and the direction of travel, each set of cutting disks provided on opposite sides of the longitudinal axis of the frame, the first set of disks positioned to lie in a plane that is generally parallel to each other, the second set of disks positioned to lie in a plane opposite of the first set of disks, first and second sets of cutting disks positioned on opposite sides of the longitudinal axis, each cutting disk including a radially outer edge lying in a plane that intersects the longitudinal axis at an acute angle, wherein the second conditioner incorporates with a supporting soil and levels a mixture of supporting soil and conditioned crop residue, the first and second set of disks positioned in a crossing direction relative to the direction of travel so crop residue is conditioned in crossing directions, the first set of disks positioned to throw soil in a same direction toward the longitudinal axis and cut and mix the crop residue into the supporting soil, the second set of disks positioned to throw soil in an opposite direction relative to the first set of disks and toward the longitudinal axis, the second set of disks positioned to cut and mix the crop residue into the supporting soil;
   a first plurality of shank assemblies spaced along and pivotably connected to a third transverse extending frame member, the first plurality of shanks positioned perpendicularly to the longitudinal axis and direction of travel;
   a second plurality of shank assemblies positioned immediately behind the first plurality of shank assemblies and the second plurality of shank assemblies positioned perpendicularly to the longitudinal axis and direction of travel, each of the second plurality of shank assemblies spaced along and pivotably connected to a fourth transverse extending frame member longitudinally spaced from the first plurality of shank assemblies; and
   a harrow section pivotably attached to the rearward end of the frame and immediately behind the second plurality of shank assemblies, the harrow section including at least one harrow frame member supporting a plurality of leveling tools, wherein the harrow frame member is positioned transversely and perpendicular to the longitudinal axis and direction of travel, and wherein at least one harrow frame member includes opposite transverse ends which each extends transversely beyond each transverse end of other frame members of the implement to smooth surface supporting soil.

2. The implement of claim 1 wherein the first and second conditioners are independently movable relative to each other.

3. The implement of claim 1 wherein the first conditioner is a plurality of stalk choppers and each of the plurality of stalk choppers includes a plurality of blades oriented generally transverse to the direction of travel.

4. The implement of claim 1 wherein the frame is movable in a first direction and wherein the radially outer edges of first and second cutting disks are oriented in a crossing direction with respect to the direction of travel.

5. The implement of claim 1 further comprising:
   a wheel system pivotably connected to the frame for supporting the frame above the supporting surface, the wheel system including a wheel; and
   an actuator interconnecting the wheel system to the frame, the actuator movable between a retracted position wherein the first conditioner engages the supporting surface and an extended position wherein the first conditioner is spaced from the supporting surface.

6. The implement of claim 5 further comprising a leveling assembly operatively connected to the frame, the leveling assembly pivoting the frame on the wheel between a first level position wherein the frame is level with the supporting surface and a second position.

7. The implement of claim 1 further comprising at least one wing pivotably supported by the frame, the wing movable between a transport position and a non-transport position.

8. The implement of claim 1 wherein the harrow includes a plurality of soil manipulators, each soil manipulator being offset from an axis of travel of each of the plurality of shank assemblies.

9. The implement of claim 3 wherein each of the plurality of stalk choppers is positionable independent of the frame.

10. The implement of claim 1 further comprising a wheel assembly pivotably connected to the frame and including a wheel, the wheel assembly movable between a first position wherein at least one of the first or second plurality of shank assemblies engages the supporting surface and a second position wherein the at least one of the first or second plurality of shank assemblies is disengaged from the supporting surface.

11. The implement of claim 1 wherein the harrow is selected from a group including a plurality of disks, a plurality of tines, at least one rolling basket, and a plurality of coulters.

12. The implement of claim 1 wherein the cutting disk includes a radially outer edge free of serrations.

13. A crop residue conditioning and incorporation implement comprising:

a frame extending along a longitudinal axis and supported above a supporting surface, the frame having a forward end connectable to a tow vehicle and a rearward end, said the frame having a plurality of spaced longitudinally frame members, and the frame having a forward end connected to a tow vehicle and the rearward end;

a first conditioner pivotably connected to a first transverse frame member for conditioning a crop residue, the first conditioner movable between a first retracted position and a second extended position independent of the frame, the first conditioner including a central hub extending along and being rotatable about a first axis transverse to the crop residue conditioning and incorporating implement travel direction, a plurality of blades circumferentially spaced about and project radially from the central hub, the first crop residue conditioner including arms extending from opposite ends thereof connected to a stalk chopper subframe pivotally connected to the transverse frame member;

a second conditioner pivotably connected to the frame at a location longitudinally spaced from the first conditioner for conditioning the crop residue, the second conditioner connected to a second transverse frame member and movable between a first retracted position and a second extended position independent of the frame, the second conditioner having first and second set of cutting disks positioned in a single line on the second transverse frame member which is perpendicular to the longitudinal axis of the frame and the direction of travel, each set of cutting disks provided on opposite sides of the longitudinal axis of the frame, the first set of disks positioned to lie in a plane that is generally parallel to each other, the second set of disks positioned to lie in a plane opposite of the first set of disks, first and second sets of cutting disks positioned on opposite sides of the longitudinal axis, each cutting disk including a radially outer edge lying in a plane that intersects the longitudinal axis at an acute angle, wherein the second conditioner incorporates with a supporting soil and levels a mixture of supporting soil and conditioned crop residue, the first and second set of disks positioned in a crossing direction relative to the direction of travel so crop residue is conditioned in crossing directions, the first set of disks positioned to throw soil in a same direction toward the longitudinal axis and cut and mix the crop residue into the supporting soil the second set of disks positioned to throw soil in an opposite direction relative to the first set of disks yet toward the longitudinal axis, the second set of disks positioned to cut and mix the crop residue into the supporting soil;

a first plurality of shank assemblies spaced along and pivotably connected to a third transverse extending frame member, the first plurality of shanks positioned perpendicularly to the longitudinal axis and direction of travel;

a second plurality of shank assemblies positioned behind the first plurality of shank assemblies and the second plurality of shank assemblies positioned perpendicularly to the longitudinal axis and direction of travel, each of the second plurality of shank assemblies spaced along and pivotably connected to a fourth transverse extending frame member longitudinally spaced from the first plurality of shank assemblies; and a harrow section pivotally attached to the rearward end of the frame behind the second plurality of shank assemblies, the harrow section including at least one harrow frame member supporting a plurality of leveling tools, wherein the harrow frame member is positioned transversely to the longitudinal axis and direction of travel, and wherein at least one harrow frame member includes opposite transverse ends which each extends transversely beyond each transverse end of other frame members of the implement to smooth surface supporting soil.

14. The implement of claim 13 wherein the first and second conditioners are independently movable relative to each other.

15. The implement of claim 13 wherein the first conditioner is a stalk chopper that includes a plurality of blades oriented generally transverse to the direction of travel.

16. The implement of claim 13 wherein the frame is movable in a first direction and wherein the radially outer edges of first and second cutting disks are oriented in a crossing direction with respect to the direction of travel.

* * * * *